(12) United States Patent
Riechel (10) Patent No.: US 8,072,393 B2
(45) Date of Patent: Dec. 6, 2011

(54) USER INTERFACE FOR A HEAD MOUNTED DISPLAY

(75) Inventor: Patrick Riechel, Briarwood, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1052 days.

(21) Appl. No.: 11/940,546

(22) Filed: Nov. 15, 2007

(65) Prior Publication Data

US 2009/0128448 A1 May 21, 2009

(51) Int. Cl.
*G09G 5/00* (2006.01)
(52) U.S. Cl. .......................................... 345/8; 345/158
(58) Field of Classification Search ................. 345/7–9, 345/156–158
See application file for complete search history.

(56) References Cited

U.S. PATENT DOCUMENTS

| | | | |
|---|---|---|---|
| 5,590,062 A * | 12/1996 | Nagamitsu et al. | 345/8 |
| 5,844,824 A | 12/1998 | Newman et al. | |
| 6,127,990 A | 10/2000 | Zwern | |
| 6,167,413 A * | 12/2000 | Daley, III | 345/8 |
| 6,347,290 B1 | 2/2002 | Bartlett | |
| 6,573,883 B1 | 6/2003 | Bartlett | |
| 6,798,429 B2 | 9/2004 | Bradski | |
| 6,853,293 B2 | 2/2005 | Swartz et al. | |
| 6,985,138 B2 * | 1/2006 | Charlier | 345/179 |
| 2006/0164230 A1 * | 7/2006 | DeWind et al. | 345/156 |
| 2008/0246694 A1 * | 10/2008 | Fischer | 345/8 |

* cited by examiner

*Primary Examiner* — Regina Liang (57) ABSTRACT

A headset comprises an arrangement and a display. The arrangement is situated at least partially on a head of a user. The display is coupled to the arrangement and capable of displaying a pointing device to the user. The headset is coupled to a mobile device which includes a sensor. When the mobile device is moved, the sensor detects a direction of the movement to generate corresponding direction data. The display displays to the user a corresponding movement of the pointing device which is determined as a function of the corresponding direction data.

22 Claims, 7 Drawing Sheets

USER INTERFACE FOR A HEAD MOUNTED DISPLAY

FIELD OF THE INVENTION

The present invention relates generally to a user interface for a head mounted display. Specifically, movements performed with the user interface are translated for a pointing device of the display.

BACKGROUND

A mobile unit may be used in a variety of environments. The mobile unit is utilized without a need to be connected to an external power supply. In order to maximize productivity with the mobile unit, a large workspace is beneficial. The mobile unit may be equipped with various accessories such as a headset in order to increase the workspace. The headset may provide a user with an audio input and an audio output component. Furthermore, the headset may include a head-mounted display so that the user is not required to view a display of the mobile unit. The head-mounted display may function substantially similar to the display of the mobile unit. For example, the head-mounted display may be equipped with a pointing device. The pointing device may be controlled using a mouse or a joystick. However, this approach restricts the mobility offered by the mobile unit. If the mobile unit is hand-held the other free hand is required to use the control device. If the mobile unit is mounted, at least one hand is required to use the control device.

SUMMARY OF THE INVENTION

The present invention relates to a headset comprising an arrangement and a display. The arrangement is situated at least partially on a head of a user. The display is coupled to the arrangement and capable of displaying a pointing device to the user. The headset is coupled to a mobile device which includes a sensor. When the mobile device is moved, the sensor detects a direction of the movement to generate corresponding direction data. The display displays to the user a corresponding movement of the pointing device which is determined as a function of the corresponding direction data.

DETAILED DESCRIPTION

The exemplary embodiments of the present invention may be further understood with reference to the following description and the appended drawings, wherein like elements are referred to with the same reference numerals. The exemplary embodiments of the present invention describe a user interface for a head-mounted display. Specifically, the exemplary embodiments of the present invention may utilize a motion or inertial sensor disposed in the interface device to detect a motion that is translated into a movement of a pointing device shown on the display. The interface device may be embodied in a hand-held MU or an accessory thereto. The user interface, the head-mounted display, the sensor, the MU, and the accessory will be discussed in more detail below.

Figure 1:
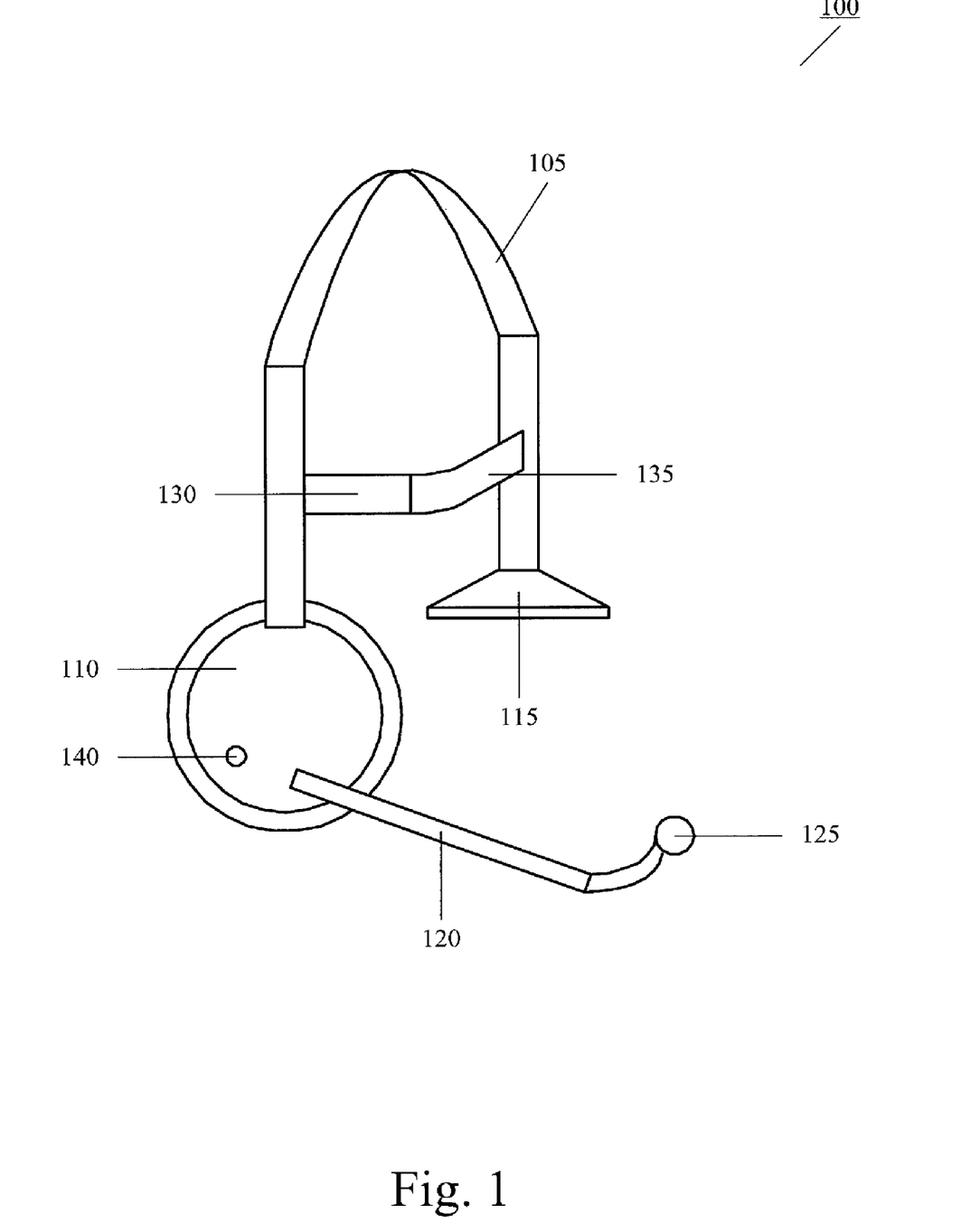
FIG. 1 shows a first view of a headset according to an exemplary embodiment of the present invention.

FIG. 1 shows a first view of a headset 100 according to an exemplary embodiment of the present invention. The headset 100 may be any device capable of being worn on a user's head where components of the headset are used to perform a functionality. For example, the headset 100 may be for a voice functionality. The headset 100 may also be configured to include additional functionalities such as displaying data to the user. The headset 100 may be a stand alone unit or may be used in conjunction with other electronic devices. For example, the headset 100 may be coupled to an MU so that data may be exchanged between the headset 100 and the MU. The coupling may be, for example, a wired connector from the headset 100 with a jack that plugs into a port of the MU. The headset 100 may include a head band 105, an audio output 110, a stabilizer 115, a boom 120, an audio input 125, an extender 130, a head-mounted display 135, and an input/output (I/O) port 140.

The head band 105 may be a supporting mechanism to allow the headset 100 to be used hands-free. The head band 105 may rest on a top surface of a user's head. The head band 105 may be partially elastic so that the head band 105 may flex to conform to the top surface of the user's head. The head band 105 may be manufactured, for example, of a semi-elastic polymer with a spring metal interior. The stabilizer 115 may be a padding disposed at a first end of the head band 105. The padding may provide a comfortable end to the head band 105. Because the ends of the head band 105 partially squeeze (e.g., to securely hold the head set 100 on the user's head), the stabilizer 115 may allow the comfortable use of the headset 100. It should be noted that the headset 100 including the head band 105 and the stabilizer 115 is only exemplary. The headset 100 may include an ear clip so that the headset 100 may be worn on a user's ear. In such an embodiment, the head band 105 and the stabilizer 115 may be unnecessary.

The audio output 110 may be, for example, a speaker. The audio output 110 may be disposed at a second end of the head band 105. The audio output 110 may include a cushion substantially similar to the stabilizer 115. Again, because the ends of the head band 105 partially squeeze, the cushion of the audio output 110 may provide the comfortable wearing of the headset 100. When the headset 100 is placed in a proper orientation on the user's head, the audio output 110 may be disposed around a user's ear. Furthermore, the stabilizer 115 may be disposed slightly above a user's other ear.

The boom 120 may be a flexible extension where a first end of the boom 120 is attached to the second end of the head band 105 or the audio output 110. A second end of the boom 120 may be attached to the audio input 125. The audio input 125 may be, for example, a microphone. The flexibility of the boom 120 may allow a user to orient the headset 100 so that the audio input 125 is disposed around a user's mouth. The audio input 125 may include a foam coat so that sounds received by the audio input 125 may be filtered. The first end of the boom 120 may be coupled to the second end of the head band 105 or the audio output 110 with a rotator. In this embodiment, the audio output 125 may be rotated in an upward position when not being used. The audio output 125 may be deactivated, thereby conserving power. Voice data received by the audio input 125 may include voice commands relating to the components of the headset 100. For example, the voice commands may activate/deactivate the head-mounted display 135. In another example, the voice commands may relate to the MU.

The extender 130 may be another flexible extension where a first end of the extender 130 is attached to the head band 105. As illustrated, the extender 130 is disposed on a right side of the head band 105. However, it should be noted that the extender 130 may be disposed on a left side of the head band 105 above the audio output 110, depending on a preference of the user. A second end of the extender 130 may be attached to the head-mounted display 135. The flexibility of the extender 130 may allow the user to orient the head-mounted display 135 over an eye of the user. The head-mounted display 135 may be clear so that a user may view data thereon or view beyond the head-mounted display 135. The head-mounted display 135 may also occlude. The first end of the extender 130 may be coupled to the head band 105 with a rotator. In this embodiment, the head-mounted display 135 may be rotated in an upward position when not being used. The head-mounted display 135 may be deactivated, thereby conserving power.

The I/O port 140 may be a device to connect the headset 100 to, for example, an MU. The I/O port 140 may be configured to receive a connector from the MU. It should be noted that the use of the I/O port 140 is only exemplary. The headset 100 may not include an actual I/O port 140. Instead, the headset 100 may be equipped with a connector and a jack to be received by a port of the MU. The I/O port 140 may also enable a wireless connection to be established with the MU. In the exemplary embodiment where a wireless connection is used, the headset 100 may include its own processor, memory, transceiver, antenna, etc.

Figure 2:
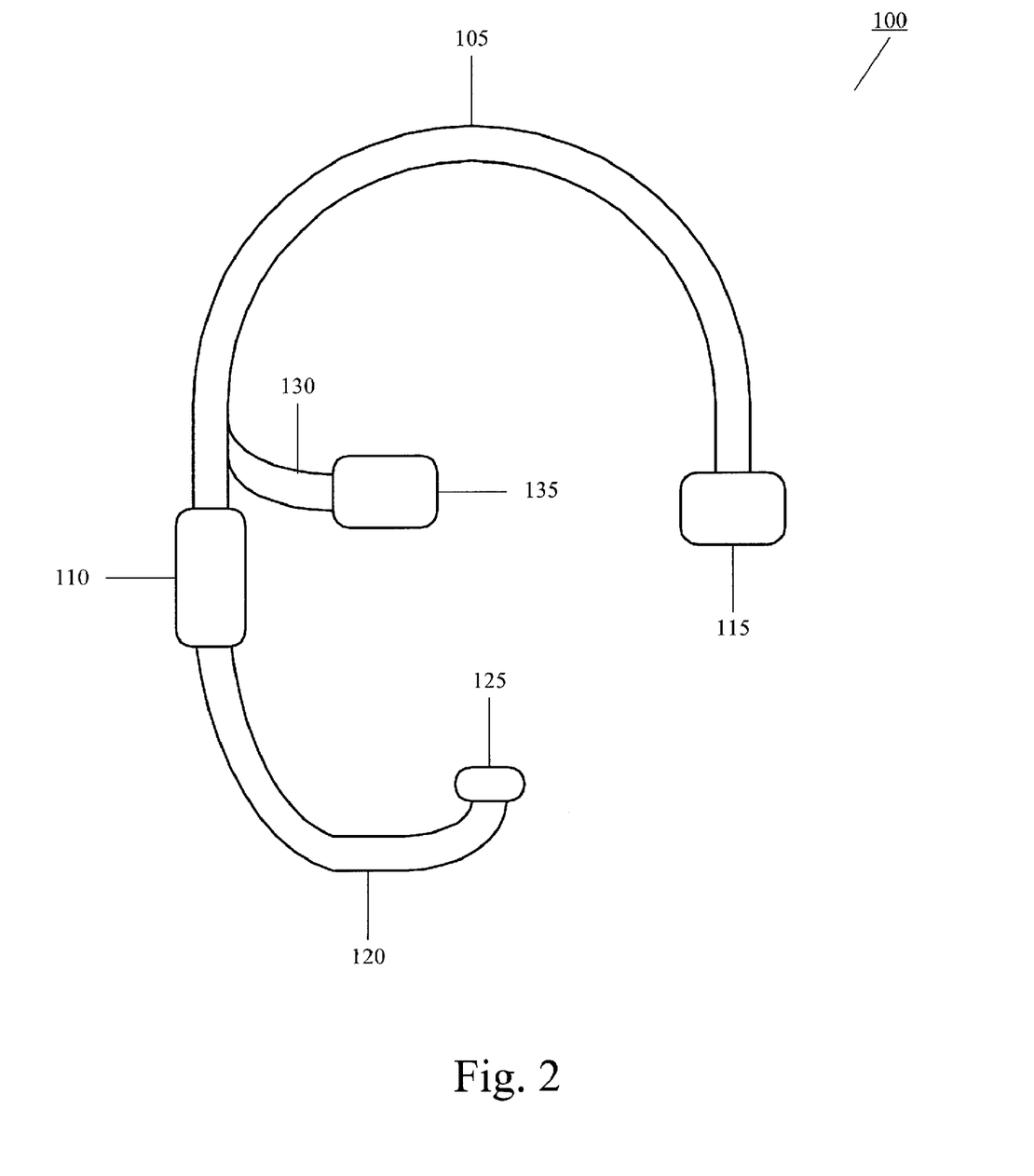
FIG. 2 shows a second view of the headset of FIG. 1 according to an exemplary embodiment of the present invention.

FIG. 2 shows a second view of the headset 100 of FIG. 1 according to an exemplary embodiment of the present invention. Specifically, the second view illustrates an orientation of the audio output 110, the audio input 125, and the head-mounted display 135 when worn by the user. As discussed above, the audio output 110 may be disposed around the user's ear. The audio input 125 may be disposed around the user's mouth. The head-mounted display 135 may be disposed around the user's eye. As illustrated, the audio output 110 and the head-mounted display 135 are disposed to be worn on a right side of a user's face.

Figure 3:
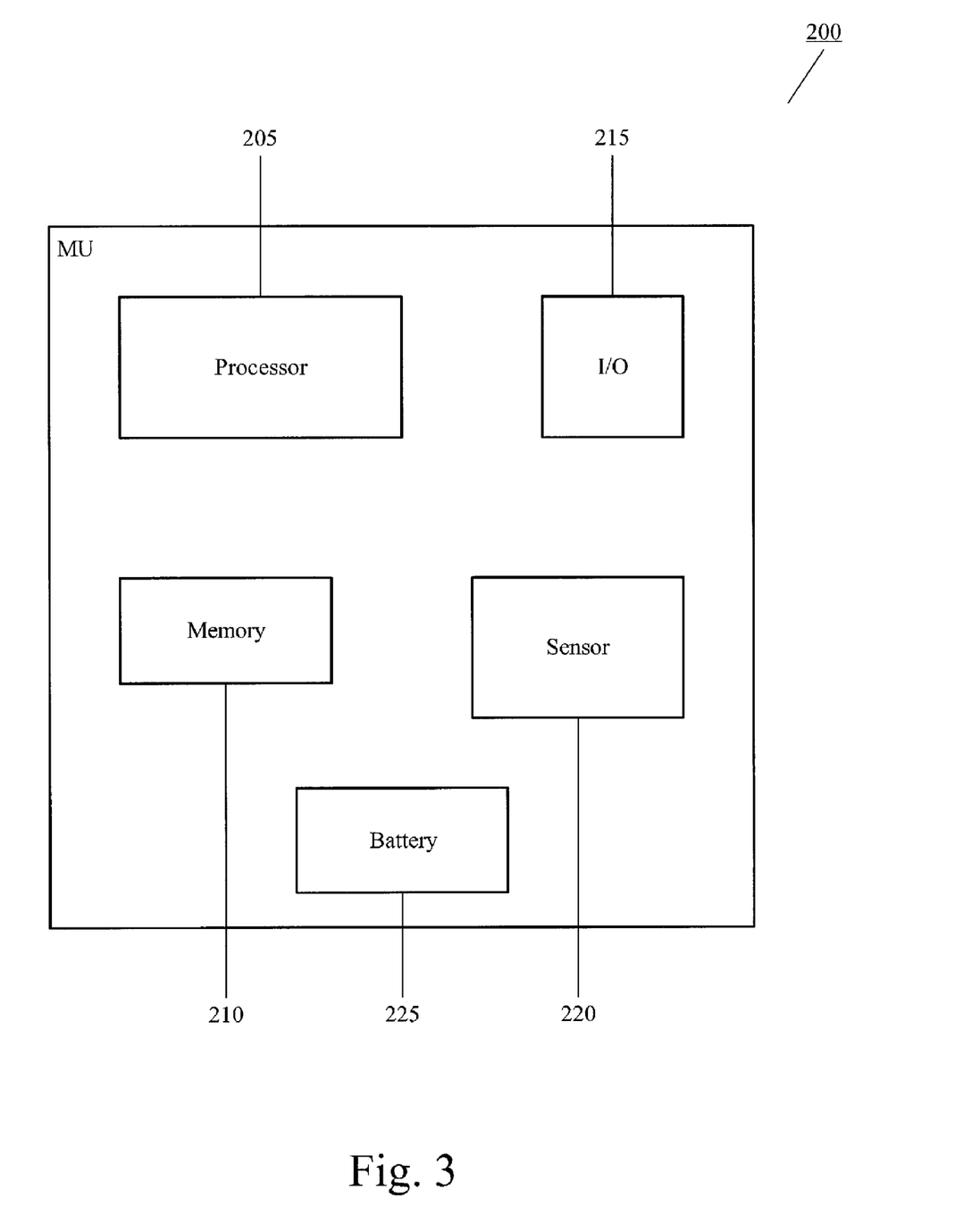
FIG. 3 shows components of a mobile unit used with the headset of FIG. 1 according to an exemplary embodiment of the present invention.

FIG. 3 shows components of an MU 200 used with the headset 100 of FIG. 1 according to an exemplary embodiment of the present invention. The MU 200 may be any portable electronic device that utilizes a portable power supply (e.g., battery, capacitor, super capacitor, etc.). For example, the MU 200 may be a laptop, a personal digital assistant, a pager, a cell phone, a scanner, an RFID device, etc. The MU 200 may include a processor 205, a memory 210, an input/output arrangement (I/O) 215, a sensor 220, and a battery 225.

The processor 205 may be a central computing component that operates the MU 200. The memory 210 may store data related to the MU 200. The data may pertain to programs installed on the MU 200, functionalities associated with the MU 200, etc. In addition, as will be discussed below, the data may also include configuration data relating to inputs received by the sensor 220. Specifically, the configuration data may indicate how a pointing device of the head-mounted display 135 moves in accordance to the inputs.

The battery 225 may be a portable power supply that provides energy to the MU 200. As discussed above, the MU 200 may be any electronic device that utilizes a portable power supply. The battery 225 may be a rechargeable battery such as a nickel cadmium (Ni—Cd), a nickel hydride (Ni—H), a lithium ion, etc. It should be noted that the battery 225 may be removed from the MU 200. While removed, the battery 225 may be recharged separately from the MU 200. The battery 225 may also provide energy to any accessory connected to the MU 200 including the headset 100.

The I/O 215 may be connected to at least one port disposed on a periphery of the MU 200. The I/O 215 may be configured to establish an electrical connection between an accessory and the MU 200. For example, as discussed above, the headset 100 may include a connector with a jack. The jack may be received in one of the ports of the MU 200. The I/O 215 may recognize the reception and establish the electrical connection between the MU 200 and the headset 100. As will be discussed below, other accessories may be connected to the MU 200. It should be noted that the I/O 215 may establish the electrical connection in other manners. For example, the I/O 215 may be a BlueTooth interface that wirelessly communicates with the I/O of the headset 100. Thus, the headset 100 may be wirelessly coupled to the MU 100.

The sensor 220 may be a motion or inertial sensor that is configured to detect a direction that the MU 200 is moved and/or determine an angle or orientation that the MU 200 is positioned. When the MU 200 is connected to the headset 100, the direction in which the MU 200 is moved may be translated by the sensor 220 or the processor 205 into a corresponding movement of the pointing device on the head-mounted display 135. For example, if the MU 200 is moved left, the pointing device is also moved to the left. In another example, if the MU 200 is moved down and right, the pointing device is also moved down and right. The sensor 220 may consist of, for example, an accelerometer. A user may activate the sensor 220 when requiring a user interface for the pointing device. Activation may be achieved by various methods such as pressing a button, a voice command, a specific gesture recognized by the MU 200 through processing the data provided by the sensor 220, etc. That is, a separate user interface such as a mouse, a stylus, etc. is not required to move the pointing device of the head-mounted display 135.

Figure 4:
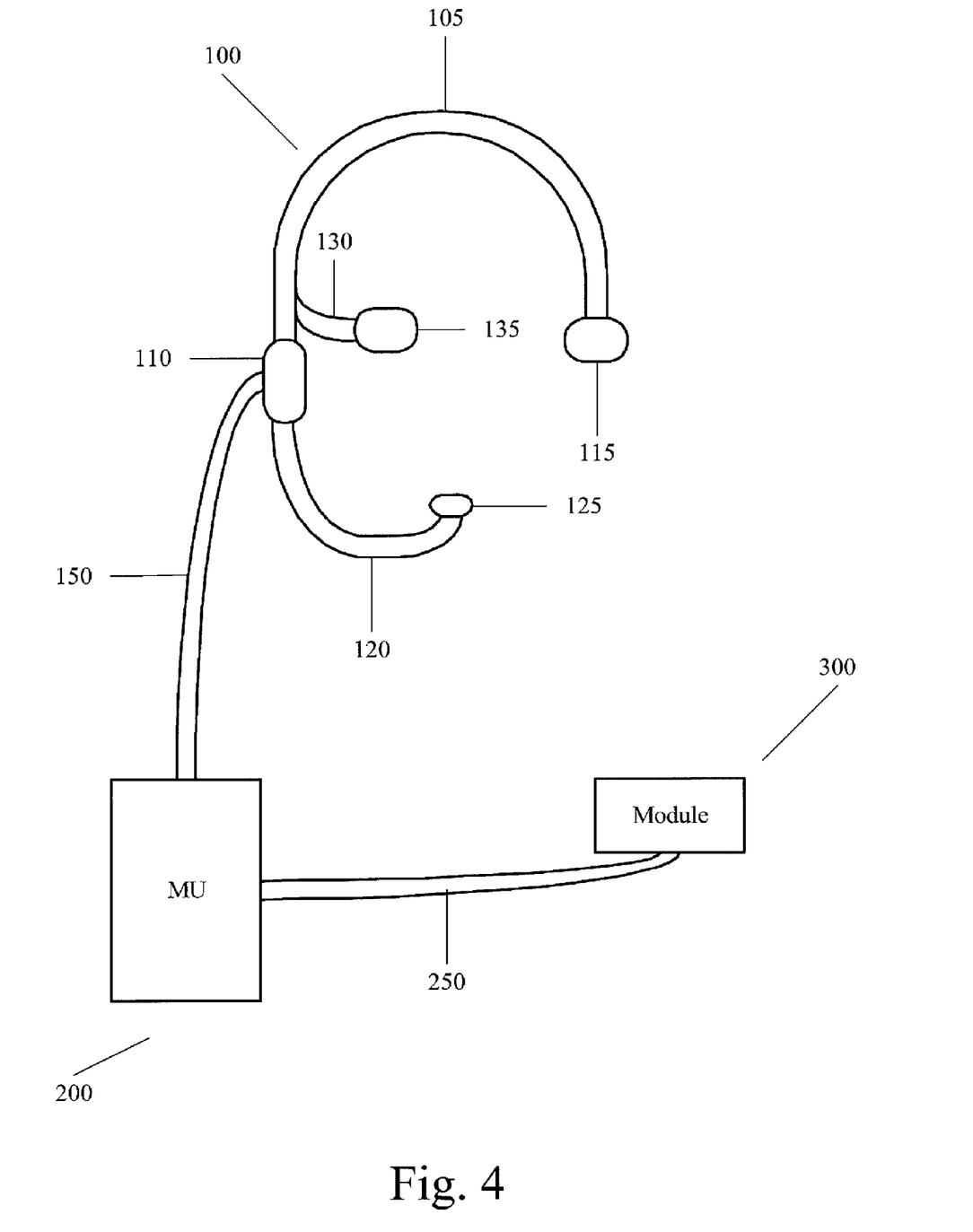
FIG. 4 shows an assembled system of components including the headset of FIG. 1, the mobile unit of FIG. 3 and a module according to an exemplary embodiment of the present invention.

FIG. 4 shows an assembled system of components including the headset 100 of FIG. 1, the MU 200 of FIG. 3 and a module 300 according to an exemplary embodiment of the present invention. As discussed above, the headset 100 may be electrically connected to the MU 200. Furthermore, the headset 100 may be equipped with a connector (extending from the port 140) that has a jack disposed on a distal end. The jack may be received by a port that is connected to the I/O 215 of the MU 200. Also, as discussed above, a module 300 or accessory may be electrically connected to the MU 200. The module 300 may be connected to the MU 200 in a substantially similar manner as the headset 100.

The module 300 may be any electronic device that provides an additional functionality. For example, the module 300 may be a data capture device such as a barcode scanner (e.g., one-dimensional, two-dimensional, color, etc.), a laser scanner, an imager, a camera, a radio frequency identification (RFID) reader, etc. In another example, the module 300 may be a communications device such as a transceiver (if the MU 200 is not equipped with such a functionality). The module 300 may be coupled to the MU 200 using any of the above described manners for coupling the MU 200 to the headset 100 such as a wired connection, a wireless connection, etc.

According to the exemplary embodiments of the present invention, the MU 200 may be wearable. That is, the MU 200 may be coupled to a mount such as a wrist mount, a finger mount, a waist mount, etc. The module 300 may also be wearable. For example, the module 300 may be a ring scanner that is worn on a finger. The MU 200 and the module 300 may also be hand-held devices that are held in a user's hand. It should be noted that the module 300 may be absent in the assembled system. That is, the module 300 may be an optional component that may be added to the system of the MU 200 and the headset 100. Thus, the MU 200 may only be coupled to the headset 100.

The module 300 may also include a processor, a memory, a battery, an I/O, and a sensor. In another exemplary embodiment, the module 300 does not include a memory or a battery as data may be stored in the memory 210 of the MU 200 and power may be provided by the battery 225 of the MU 200. The I/O of the module 300 may be coupled to the MU 200. The processor of the module 300 may be less complex than the processor 205 of the MU 200 as the processor of the module 300 need only execute the functionality provided thereby. The module 300 may also include the sensor that is substantially similar to the sensor 220 of the MU 200. Thus, the module sensor may provide the movement data that is translated into the corresponding movement of the pointing device of the head-mounted display 135. When the module 300 provides the movement data, the MU 200 may not be equipped with the sensor 220 as it is redundant. Furthermore, when the module 300 provides the movement data, the MU 200 may be fixedly worn, for example, on a waist mount.

In another exemplary embodiment of the present invention, the MU 200 and the module 300 may be equipped with the sensor (not shown). The sensor of the module 300 may be substantially similar to the sensor 220 of the MU 200. When the module 300 is present, the sensor of the module 300 may override the sensor 220 of the MU 200. For example, when the module 300 is connected to the MU 200, the sensor 220 may be deactivated while the sensor of the module 300 is activated. In another example, the type of mount may determine activation or deactivation of the sensor. When a waist mount is connected to the MU 200, the MU 200 may recognize that the MU 200 is likely to remain fixed in position. Thus, the MU 200 may deactivate the sensor 220.

It should be noted that the use of the module 300 is only exemplary. The module 300 may provide an additional functionality to the MU 200. However, the MU 200 may come equipped with the functionality provided by the module 300. Thus, the module 300 may represent providing a functionality that is not available to the MU 200.

Figure 5A:
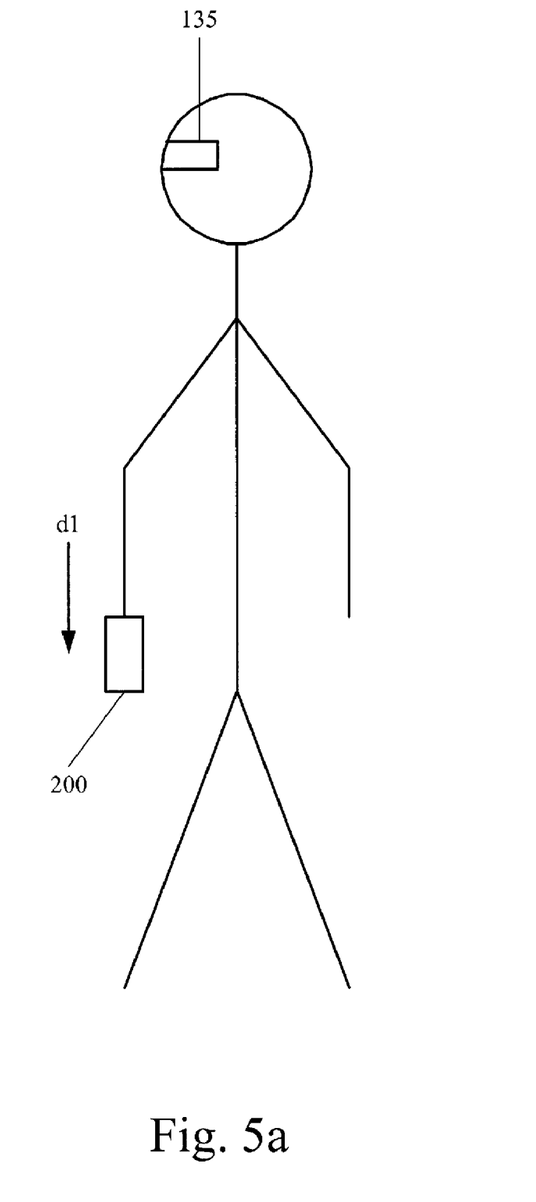
FIG. 5a shows a first movement of the mobile unit of FIG. 3 according to an exemplary embodiment of the present invention.

FIG. 5a shows a first movement of the MU 200 of FIG. 3 according to an exemplary embodiment of the present invention. As illustrated, the MU 200 is hand-held, in particular, being held in a right hand of the user. The headset 100 (not shown) is worn on the user's head with the head-mounted display 135 disposed over the user's right eye. The MU 200 and the headset 100 may be coupled and the sensor 220 may be activated. The MU 200 may be moved in any planar direction. The first movement involves moving the MU 200 down in the direction d1. It should be noted that the use of the MU 200 is only exemplary. As discussed above, the module 300 may also include the sensor. Thus, the MU 200 may be worn, while the module 300 is hand-held or worn, for example, on the user's wrist or finger.

Figure 5B:
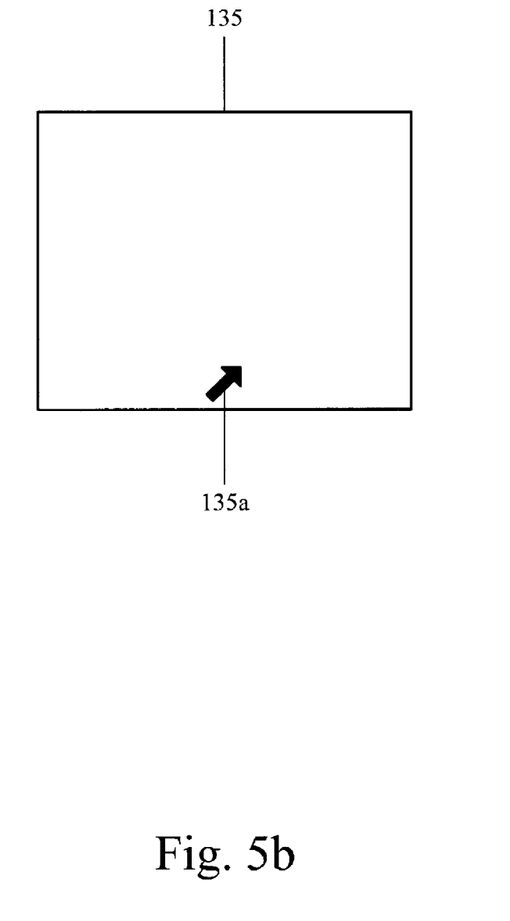
FIG. 5b shows a first translation of the first movement of FIG. 5a on a head-mounted display according to an exemplary embodiment of the present invention.

FIG. 5b shows a first translation of the first movement of FIG. 5a on the head-mounted display 135 according to an exemplary embodiment of the present invention. FIG. 5b shows a view of how the user sees the head-mounted display 135. As discussed above, the head-mounted display 135 may include a pointing device 135a. It should be noted that the illustration of the first translation assumes that the point device 135a was originally located in a central position on the head-mounted display 135. The first movement of FIG. 5a is in the direction d1. The direction d1 is measured by the sensor 220 as going straight downward. Thus, this movement may be translated into a straight downward movement of the pointing device 135a.

Figure 6A:
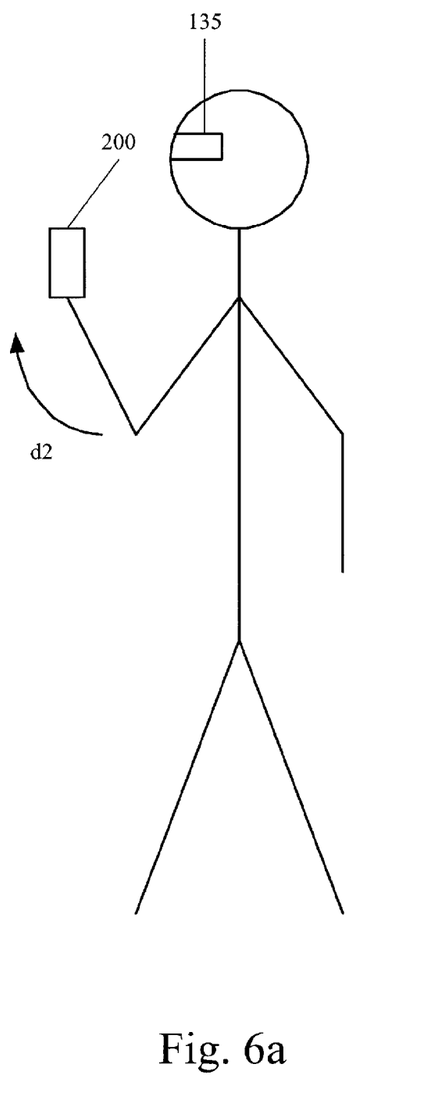
FIG. 6a shows a second movement of the mobile unit of FIG. 3 according to an exemplary embodiment of the present invention.

FIG. 6a shows a second movement of the MU 200 of FIG. 3 according to an exemplary embodiment of the present invention. As illustrated, the MU 200 is hand-held, in particular, being held in a right hand of the user, while the headset 100 (not shown) is worn on the user's head with the head-mounted display 135 disposed over the user's right eye. The MU 200 and the headset 100 may be electrically connected and the sensor 220 may be activated. The second movement involves moving the MU 200 upward and to the right in the direction d2. It should again be noted that the use of the MU 200 is only exemplary and the movement may be of the module 300.

Figure 6B:
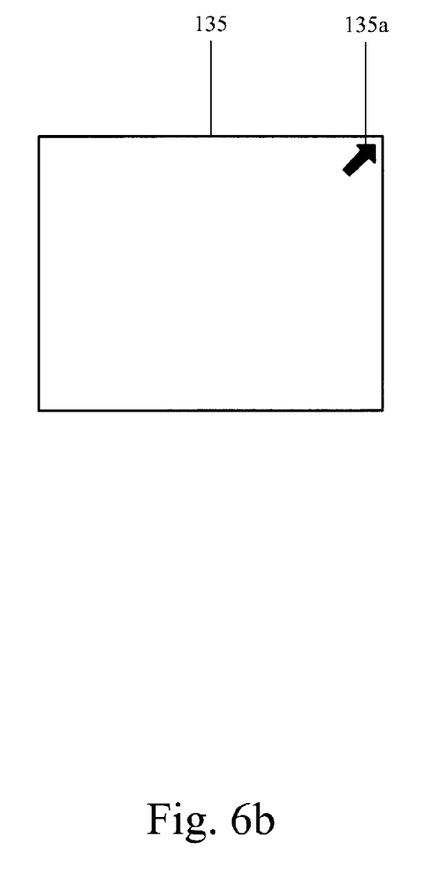
FIG. 6b shows a second translation of the second movement of FIG. 6a on a head-mounted display according to an exemplary embodiment of the present invention.

FIG. 6b shows a second translation of the second movement of FIG. 6a on the head-mounted display 135 according to an exemplary embodiment of the present invention. FIG. 6b shows a view of how the user sees the head-mounted display 135. As discussed above, the head-mounted display 135 may include the pointing device 135a. It should again be noted that the illustration of the second translation assumes that the point device 135a was originally located in a central position on the head-mounted display 135. The second movement of FIG. 6a is in the direction d2. The direction d2 is measured by the sensor 220 as going upward and to the right. Thus, this movement may be translated into an upward and to the right movement of the pointing device 135a.

Figure 7A:
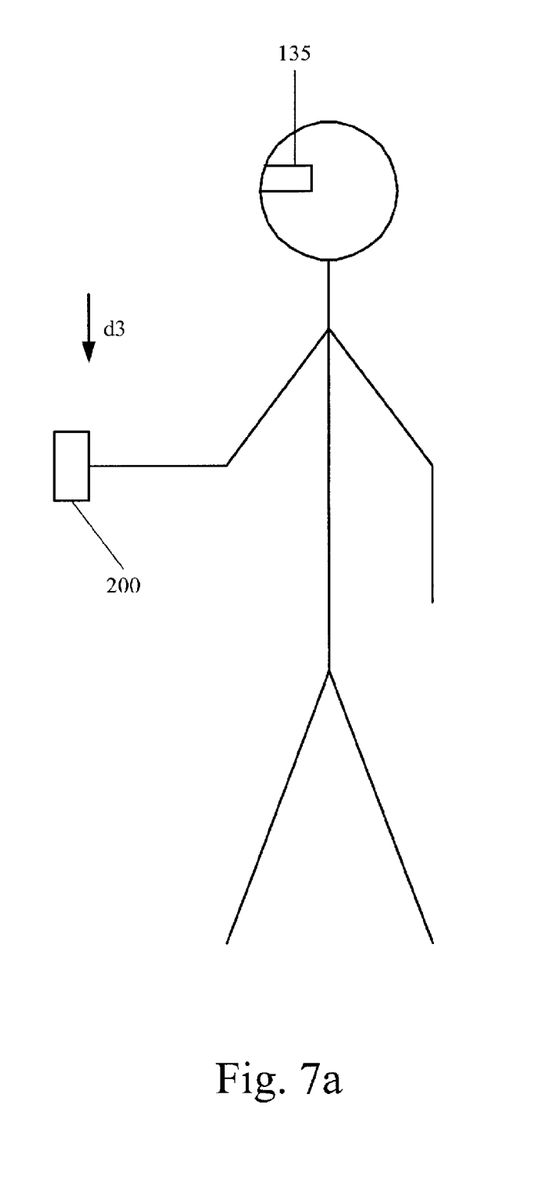
FIG. 7a shows a third movement subsequent to the second movement of FIG. 6a of the mobile unit of FIG. 3 according to an exemplary embodiment of the present invention.

FIG. 7a shows a third movement subsequent to the second movement of FIG. 6a of the MU 200 of FIG. 3 according to an exemplary embodiment of the present invention. In this exemplary embodiment, the third movement relates to moving the MU 200 upon moving the MU 200 in the direction d2. The third movement involves moving the MU 200 down in the direction d3.

Figure 7B:
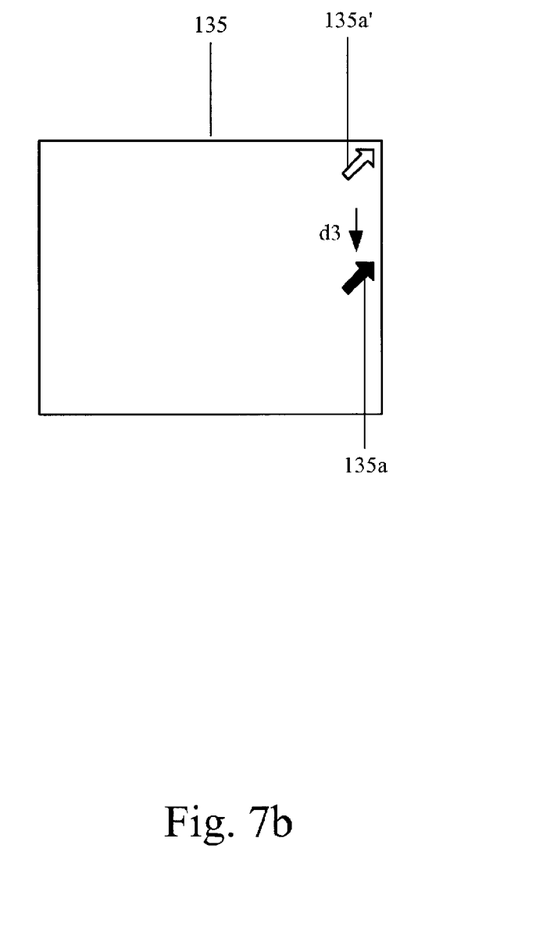
FIG. 7b shows a third translation of the third movement of FIG. 7a on a head-mounted display according to an exemplary embodiment of the present invention.

FIG. 7b shows a third translation of the third movement of FIG. 7a on the head-mounted display 135 according to an exemplary embodiment of the present invention. FIG. 7b shows a view of how the user sees the head-mounted display 135. In this exemplary embodiment, the pointing device 135a' was originally located in an upper right corner of the head-mounted display 135. The third movement of FIG. 6a is in the direction d3. The direction d3 is measured by the sensor 220 as going straight downward. Thus, this movement may be translated into a downward movement of the pointing device 135a from the position last seen in FIG. 6b.

The exemplary embodiments of the present invention enable a user to utilize a pointing device for a head-mounted display without requiring a use of both hands of the user. For example, if the MU is hand-held, a touch pad or stylus may be necessary to move the pointing device. Thus, one hand may hold the MU while the other hand uses the interface to move the pointing device. The sensor disposed in the MU and/or the module of the exemplary embodiments allow the pointing device to be moved with a single hand. As discussed above, a movement of the MU or the module itself translates into the movement of the pointing device.

The exemplary embodiments of the present invention also enable a user to utilize a pointing device for a head-mounted display without requiring the user to move the user's head. For example, if the MU is hand-held, a touch pad or stylus may be necessary to move the pointing device. In each of these cases, the user is required to look down at the MU in order to use the pointing device. With the sensor integrated in the MU 200 or module 300, the user does not need to look away from the head-mounted display.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A headset, comprising:
an arrangement situated at least partially on a head of a user; and
a display coupled to the arrangement, the display capable of displaying a pointing device to the user,
wherein the headset is coupled to a mobile device which includes a sensor, when the mobile device is moved, the sensor detects a direction of the movement to generate corresponding direction data, the display displaying to the user a corresponding movement of the pointing device which is determined as a function of the corresponding direction data,
wherein the mobile device is coupled to an accessory which includes an accessory sensor detecting a second direction in which the accessory is moved to generate second corresponding direction data, the display displaying to the user a second corresponding movement of the pointing device which is determined as a function of the second corresponding direction data.

2. The headset of claim 1, wherein the headset is coupled to the mobile device through one of a wired connection and a wireless connection.

3. The headset of claim 1, wherein the mobile device is coupled through one of a wired connection and a wireless connection to the accessory.

4. The headset of claim 1, wherein the accessory is a data capture device including at least one of a scanner, an imager, a camera, and a radio frequency identification reader.

5. The headset of claim 1, wherein an activation of the accessory sensor deactivates the sensor of the mobile device.

6. The headset of claim 1, wherein the display is oriented to be over an eye of the user.

7. The headset of claim 1, wherein the sensor is one of a motion sensor and an inertial sensor.

8. The headset of claim 1, wherein the sensor includes an accelerometer.

9. The headset of claim 1, wherein the display is coupled to an extender extending from a frame of the headset.

10. The headset of claim 9, wherein when the extender is moved in an upright position, the display is deactivated.

11. The headset of claim 1, further comprising:
an audio input receiving voice data, the voice data including voice commands one of activating and deactivating the display.

12. A mobile device, comprising:
an input/output arrangement coupled to a headset that includes a display, the display capable of displaying a pointing device to a user; and
a sensor detecting a direction corresponding to a movement of the mobile device to generate corresponding direction data, the display displaying to the user a corresponding movement of the pointing device which is determined as a function of the corresponding direction data,
an input/output component for coupling the mobile device to an accessory which includes an accessory sensor, the accessory sensor detecting a second direction in which the accessory is moved to generate second corresponding direction data, the display displaying to the user a second corresponding movement of the pointing device which is determined as a function of the second corresponding direction data.

13. The mobile device of claim 12, wherein the mobile device is coupled to the headset through one of a wired connection and a wireless connection.

14. The mobile device of claim 12, wherein the mobile device is coupled through one of a wired connection and a wireless connection to the accessory.

15. The mobile device of claim 12, wherein the accessory is a data capture device including at least one of a scanner, an imager, a camera, and a radio frequency identification reader.

16. The mobile device of claim 12, wherein an activation of the accessory sensor deactivates the sensor of the mobile device.

17. The mobile device of claim 12, wherein the mobile device is fixedly mounted.

18. The mobile device of claim 12, further comprising:
a portable power supply providing energy to the mobile device and the headset.

19. The mobile device of claim 12, wherein the sensor is one of a motion sensor and an inertial sensor.

20. The mobile device of claim 19, wherein the sensor includes an accelerometer.

21. The mobile device of claim 12, wherein the sensor is manually activated.

22. A system, comprising:
a headset including an arrangement situated at least partially on a head of a user and a display coupled to the arrangement, the display capable of displaying a pointing device to the user; and
a mobile device coupled to the headset and an accessory, the mobile device including an input/output arrangement establishing the coupling and a sensor detecting a direction in which the mobile device is moved to generate corresponding direction data, the display displaying to the user a corresponding movement of the pointing device which is determined as a function of the corresponding direction data,
the accessory which includes an accessory sensor, the accessory sensor detecting a second direction in which the accessory is moved to generate second corresponding direction data, the display displaying to the user a second corresponding movement of the pointing device which is determined as a function of the second corresponding direction data.

* * * * *